United States Patent [19]
Liu et al.

[11] Patent Number: 6,107,772
[45] Date of Patent: *Aug. 22, 2000

[54] SENSORLESS SWITCHED RELUCTANCE MOTOR CONTROL

[75] Inventors: Ning Liu, Ypsilanti; Ramani R. Kalpathi, Ann Arbor; Scott E. Blackburn, Temperance; David C. Reuter, Saline, all of Mich.

[73] Assignee: Dana Corporation, Toledo, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/100,733

[22] Filed: Jun. 19, 1998

Related U.S. Application Data

[60] Provisional application No. 60/059,935, Sep. 26, 1997.

[51] Int. Cl.[7] .................................................. H02P 1/46
[52] U.S. Cl. ............................ 318/701; 318/254; 318/439
[58] Field of Search .................................... 318/138, 139, 318/245, 254, 439, 701–832, 696, 685

[56] References Cited

U.S. PATENT DOCUMENTS

| | | | |
|---|---|---|---|
| 4,303,871 | 12/1981 | Berry | 318/138 |
| 4,520,302 | 5/1985 | Hill et al. | 318/696 |
| 4,595,865 | 6/1986 | Jahns | 318/254 |
| 4,611,157 | 9/1986 | Miller et al. | 318/696 |
| 4,707,650 | 11/1987 | Bose | 318/685 |
| 4,739,240 | 4/1988 | MacMinn et al. | 318/696 |
| 4,740,738 | 4/1988 | El-Antably et al. | 318/701 |
| 4,777,419 | 10/1988 | Obradovic | 318/696 |
| 4,928,049 | 5/1990 | Pietrobon et al. | 318/685 |
| 4,933,620 | 6/1990 | MacMinn et al. | 318/696 |
| 5,006,772 | 4/1991 | Danby | 318/696 |
| 5,012,171 | 4/1991 | Sember | 318/696 |
| 5,012,172 | 4/1991 | Sember | 318/696 |
| 5,028,852 | 7/1991 | Dunfield | 318/254 |
| 5,072,166 | 12/1991 | Ehsani | 318/696 |
| 5,084,663 | 1/1992 | Olsson | 318/701 |
| 5,097,190 | 3/1992 | Lyons et al. | 318/701 |
| 5,247,235 | 9/1993 | Tu et al. | 318/685 |
| 5,291,115 | 3/1994 | Ehsani | 318/701 |
| 5,334,917 | 8/1994 | Lind | 318/254 |
| 5,420,492 | 5/1995 | Sood et al. | 318/809 |
| 5,457,374 | 10/1995 | Branecky et al. | 318/801 |
| 5,497,064 | 3/1996 | Van Sistine | 318/701 |
| 5,525,887 | 6/1996 | Van Sistine | 318/701 |
| 5,530,333 | 6/1996 | Turner | 318/701 |
| 5,534,763 | 7/1996 | Williams et al. | 318/799 |
| 5,552,685 | 9/1996 | Young et al. | 318/254 |
| 5,569,990 | 10/1996 | Dunfield | 318/254 |
| 5,589,751 | 12/1996 | Lim | 318/701 |
| 5,694,010 | 12/1997 | Oomura et al. | 318/254 |
| 5,786,681 | 7/1998 | Kalpathi | 318/701 |
| 5,821,708 | 10/1998 | Williams et al. | 318/254 |

*Primary Examiner*—Paul Ip
*Attorney, Agent, or Firm*—Dykema Gossett PLLC

[57] ABSTRACT

A method for controlling a motor and a circuit for implementing the method are provided. The method includes the steps of providing current to a first phase coil of a motor and measuring the time for the current to rise between two predetermined levels. Because current rise time is proportional to phase inductance, and therefore, rotor position, the measured current rise time can be compared to a desired current rise time to determine whether conduction intervals in the motor phases are in-phase with the position of the rotor or are lagging or leading the position of the rotor. The method finally includes the step of supplying current to one of the first phase coil and a second phase coil responsive to the measured rise time in order to bring subsequent conduction intervals into phase with the position of the rotor.

19 Claims, 7 Drawing Sheets

SENSORLESS SWITCHED RELUCTANCE MOTOR CONTROL

This application claims the benefit of U.S. Provisional Application No. 60/059, 935, filed Sep. 26, 1997.

BACKGROUND OF THE INVENTION

1. Field of the Invention

This invention relates to switched reluctance motor controls, and, more particularly, to a method and a circuit for controlling a switched reluctance motor through indirect sensing of rotor position within the switched reluctance motor.

2. Disclosure of Related Art

A conventional switched reluctance motor (SRM) includes a stator having a plurality of pairs of diametrically opposed stator poles and a rotor having a plurality of pairs of diametrically opposed rotor poles. Windings or coils are typically disposed about the stator poles and the windings around any two diametrically opposed stator poles may be connected in series or in parallel to define one motor phase of the multiphase SRM. The windings associated with a motor phase may be referred to as a phase coil. By generating current through the phase coil, magnetic fields are established about the stator poles and a torque is produced that attracts a pair of rotor poles into alignment with the stator poles. The current in the phase coils is generated in a predetermined sequence in order to produce a constant torque on the rotor. The period during which current is provided to the phase coil—and the rotor poles are brought into alignment with the stator poles—is known as the "active stage" or conduction interval of the motor phase. At a certain point—either as the rotor poles become aligned with the stator poles or at some point prior thereto—it becomes desirable to commutate the current in the phase coil to prevent a negative or braking torque from acting on the rotor poles. Once this "commutation point" is reached, current is no longer generated in the phase coil and the current is allowed to dissipate from the phase coil. The period during which current is allowed to dissipate from the phase coil is known as the "inactive stage" of the motor phase.

In order to maintain a relatively constant torque on the rotor—and to thereby optimize motor efficiency—it is important to maintain an "in-phase" relationship between the position of the rotor and the active stage or conduction interval of each motor phase. In other words, it is important that the conduction interval be initiated, controlled, and commutated as the rotor reaches predetermined rotational positions. If the conduction interval is initiated and/or commutated too early or too late with respect to the position of the rotor (i.e., the conduction interval "leads" or "lags" the rotor), a constant torque on the rotor will not be maintained and the motor will not operate at an optimum efficiency.

Conventional switched reluctance motors have attempted to maintain an "in-phase" relationship between the conduction intervals of the motor phases and the position of the rotor by continuously sensing rotor position and adjusting the control signals that initiate and commutate the conduction intervals in response thereto. These conventional motors have employed a variety of "direct" and "indirect" methods and means for sensing rotor position. Conventional direct sensing means have included Hall-effect sensors and optical sensors mounted directly on the rotor or disposed proximate thereto. These direct sensors are disadvantageous because they consume a large amount of space, are relatively expensive and are unreliable. Indirect sensing methods and circuits have overcome some of the deficiencies of direct sensors. However, conventional indirect sensing methods and circuits have often required complex and expensive hardware to implement. Moreover, conventional indirect sensing means are often limited in the range of motor speeds over which they can successfully operate.

There is thus a need for a circuit and a method for controlling a switched reluctance motor that will minimize or eliminate one or more of the above-mentioned deficiencies.

SUMMARY OF THE INVENTION

The present invention provides a circuit and a method for controlling a motor such as a switched reluctance motor.

An object of the present invention is to provide a circuit and a method for controlling a motor that utilize indirect sensing of rotor position.

Another object of the present invention is to provide a circuit and a method for controlling a motor that require less hardware to implement and are less expensive as compared to conventional circuits and methods.

Yet another object of the present invention is to provide a circuit and a method for controlling a motor that can be used over a wider range of motor speeds as compared to conventional circuits and methods.

A method for controlling a motor in accordance with the present invention includes the steps of providing current to a first phase coil of a motor and measuring a rise time period for the current in the first phase coil to rise between first and second predetermined current levels. A method in accordance with the present invention also includes the step of supplying current to either the first phase coil or a second phase coil in response to the measured rise time period. The inventive method is based on the principle that current rise time in a motor phase coil is directly proportional to inductance in the phase coil. Because inductance in the phase coil is indicative of rotor position, current rise time can also be used to indicate rotor position. The measured current rise time may be compared to a desired current rise time that is indicative of an "in-phase" relationship between a conduction interval and rotor position. This comparison can then be used to generate control signals that adjust the initiation or commutation of subsequent conduction intervals in order to create an "in-phase" relationship between the conduction intervals and rotor position. In one embodiment of the present invention, current rise time within the conduction interval is sampled and compared to a desired value. In another embodiment of the present invention, current rise time within one or more timing intervals following the conduction interval is sampled and compared to a desired value.

A circuit in accordance with the present invention includes means for providing current to a first phase coil of the motor. The providing means may include a switch disposed on either side of the phase coil and a microcontroller that generates control signals for selectively closing the switches and coupling the phase coil to a power source. A circuit in accordance with the present invention may also include a rise time signal generator that generates a rise time signal indicative of a rise time period for the current in the first phase coil to rise between first and second predetermined current levels. The rise time signal generator may include a pair of comparators that compare a measured current level in the first phase coil to the first and second predetermined current levels and a logic gate, such as an AND gate, that outputs the rise time signal. The circuit may finally include means for supplying current to either the first phase coil or a second phase coil responsive to the rise time signal.

A circuit and method in accordance with the present invention represent a significant improvement over conventional circuits and methods for controlling a motor. The inventive circuit and method utilize indirect or sensorless means for determining rotor position. Accordingly, the inventive circuit and method are less costly in terms of size and expense as compared to direct sensing means. The inventive circuit and method also represent an improvement when compared to conventional indirect sensing means, however. Because the inventive circuit and method rely upon current rise time as an estimator of rotor position—rather than more complex position estimators—the inventive circuit and method are less complex and less expensive than conventional indirect sensing means. Moreover, the inventive circuit and method can be implemented over a wider range of motor speeds as compared to conventional indirect sensing means.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figures 1, 2:
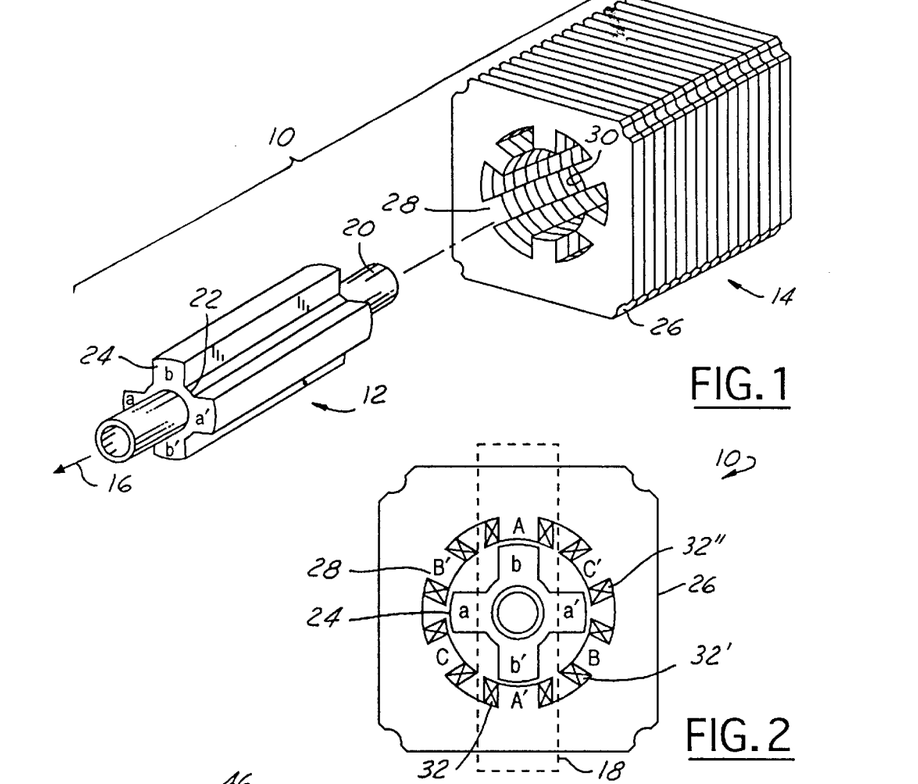
FIG. 1 is an exploded perspective view of a conventional switched reluctance motor.
FIG. 2 is a cross-sectional view of a conventional switched reluctance motor.

Referring now to the drawings wherein like reference numerals are used to identify identical components in the various views, FIGS. 1 and 2 illustrate a conventional switched reluctance motor 10. Although the illustrated motor comprises a switched reluctance motor, it should be understood that the invention as disclosed herein could be applied to other motors as is known in the art. Motor 10 includes a rotor assembly 12 and a stator assembly 14, both of which may be centered about an axis 16. A representative motor phase 18 is indicated by a dashed-line box, while the other two motor phases are not shown. Although the illustrated embodiment includes three motor phases 18, it will be understood by those skilled in the art that the number of motor phases 18 may vary.

Rotor assembly 12 is provided to move a load (not shown) connected to rotor assembly 12. Assembly 12 includes a shaft 20 and a rotor 22 disposed about shaft 20. Shaft 20 is provided to engage either the load or another means for engaging the load. Shaft 20 extends longitudinally along axis 16 and may be centered about axis 16. Rotor 22 is provided to impart rotation to shaft 20 and is capable of clockwise or counter-clockwise rotation. Rotor 22 may be made from a material having a relatively low magnetic reluctance, such as iron. Rotor 22 may be centered about axis 16 and may include a spline or key (not shown) configured to be inserted within a keyway (not shown) in shaft 20. Rotor 22 includes a plurality of radially outwardly extending rotor poles 24 configured as diametrically opposed rotor pole pairs a–a', b–b'. Each of poles 24 is generally rectangular in cross-section and may include one or more radially outwardly extending teeth as is known in the art. It will be understood by those skilled in the art that the number of poles 24 of rotor 22 may vary.

Stator assembly 14 is provided produce a torque to cause rotation of rotor assembly 12. Stator assembly 14 may comprise a plurality of laminations 26 that are formed from a material, such as iron, having a relatively low magnetic reluctance. Assembly 14 includes a plurality of radially inwardly extending poles 28 configured as diametrically opposed stator pole pairs A–A', B–B', C–C'. Each pair of stator poles 28 is provided to attract a corresponding pair of rotor poles 24 of rotor assembly 12 and thereby cause rotation of rotor assembly 12. Poles 28 are generally rectangular in cross-section and may include one or more radially inwardly extending teeth (not shown) as is known in the art. Poles 28 may extend along the axial length of stator assembly 14 and define a bore 30 that is adapted to receive rotor assembly 12. It will be understood by those in the art that the number of stator poles 28 may vary.

Rotation of rotor assembly 12 is produced by initiating, and later commutating, in a predetermined sequence, conduction intervals in phase coils 32, 32', 32", respectively, surrounding each stator pole pair. Phase coils 32, 32', 32" are formed by connecting, in series or in parallel, windings on diametrically opposed stator poles 28. As one of phase coils 32, 32', 32" begins to conduct current, the nearest rotor pole pair is magnetically attracted towards the stator pole pair around which the energized phase coil is wound. By initiating and commutating conduction intervals in phase coils surrounding consecutive stator pole pairs, a relatively constant torque can be produced.

Figure 3:
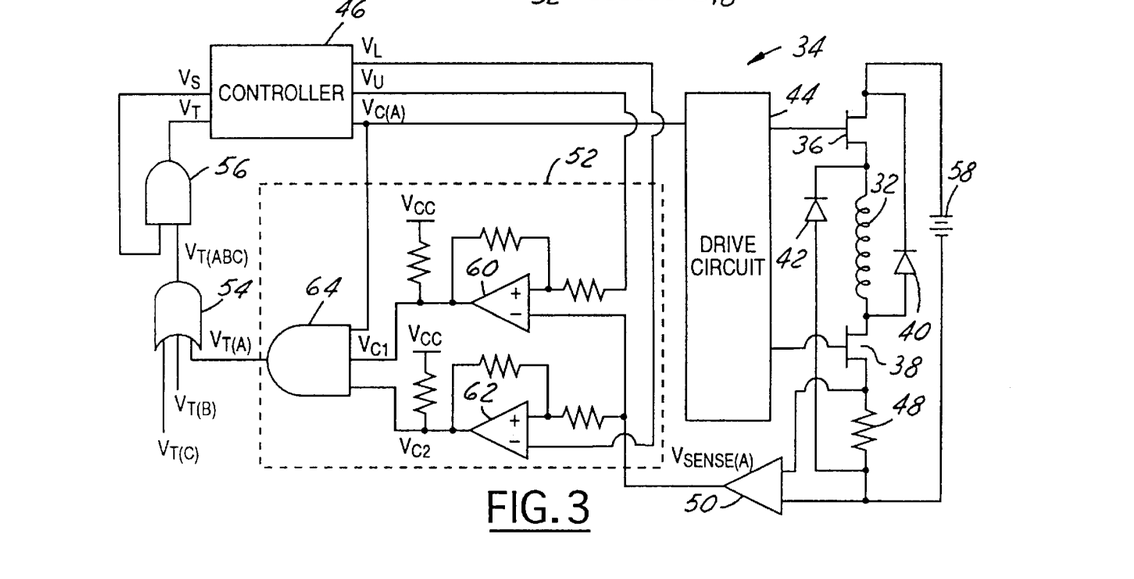
FIG. 3 is a combination schematic and block diagram illustrating a circuit in accordance with the present invention.

Referring now to FIG. 3, a circuit 34 for controlling the current in coil 32 in accordance with the present invention is illustrated. Circuit 34 represents an equivalent circuit for one motor phase 18 of motor 10. It should be understood, however, that portions of circuit 34, such as controller 46, may form part of multiple motor phases 18. Circuit 34 may include means, such as switches 36, 38, for providing current to phase coil 32, diodes 40, 42, a drive circuit 44, and a controller 46. In accordance with the present invention, circuit 34 may also include the following elements: means, such as sensing resistor 48 and amplifier 50, for generating a current indicative signal $V_{SENSE(A)}$ indicative of a level of current in coil 32; means, such as rise time signal generator 52, for generating a rise time signal $V_{T(A)}$ indicative of a rise time period for the current in coil 32 to rise between predetermined lower and upper current levels; and logic gates 54, 56. Although only one motor phase 18 of motor 10 is illustrated in FIG. 3, it will be appreciated that the other motor phases 18 of motor 10 may have substantially similar constructions.

Switches 36, 38 are provided to selectively couple a power supply 58 to phase coil 32 to energize and deenergize coil 32. Switches 36, 38 are conventional in the art and may take any of a plurality of forms well known in the art. For example, switches 36, 38 may comprise MOSFETs. Switch 36 is connected to a first end of coil 32 in series with coil 32. Switch 38 is connected to a second end of coil 32, also in series with coil 32.

Diodes 40, 42 are provided to control the dissipation of current from coil 32 and, in particular, to return the current in coil 32 to power supply 58. Diodes 40, 42 are conventional in the art. Diode 40 may be connected in parallel with the series combination of switch 36 and coil 32. Diode 42 may be connected in parallel with the series combination of switch 38 and coil 32. When one of switches 36, 38 is open and the other of switches 36, 38 is closed, the current in phase coil 32 circulates within control circuit 34 and dissipates relatively slowly. For example, if switch 36 is opened and switch 38 is closed, the current will circulate along the path comprised of switch 38, diode 42 and coil 32. When both of switches 36, 38 are open, the current in coil 32 rapidly dissipates as it is returned to power supply 58 along the path comprised of power supply 58, diode 42, coil 32, and diode 40.

Drive circuit 44 is provided to adjust the voltage level of a phase control signal $V_{C(A)}$ in a conventional manner to account for different tolerances and requirements among the components of circuit 34. Drive circuit 44 may also be provided to control the current within coil 32 between predetermined upper and lower current levels during a conduction interval in coil 32.

Controller 46 is provided to initiate and commutate the conduction interval of each motor phase 18. In particular, and in accordance with the present invention, controller 46 is provided to initiate and commutate the conduction interval of each motor phase 18 responsive to measured current rise times in the phase coils 32, 32', 32" of each motor phase 18. Controller 46 is conventional in the art and may comprise either discrete circuits or a programmable microcontroller. Controller 46 may generate phase control signals, such as phase control signal $V_{C(A)}$, to control the initiation and commutation of the conduction interval in each motor phase 18. Controller 46 may also generate upper and lower current level signals $V_U$ and $V_L$ to be used by comparators 52, 54 in the manner described hereinbelow.

Sensing resistor 48 is provided to generate a signal indicative of the level of current in coil 32 and is conventional in the art. Resistor 48 may have one terminal connected to switch 38 and a second terminal connected to ground. It will be understood by those in the art that a variety of conventional current sensors could be employed, including, for example, Hall effect current sensors.

Amplifier 50 is provided to convert the signal generated by sensing resistor 48 into current indicative signal $V_{SENSE(A)}$. Amplifier 50 is conventional in the art.

Rise time signal generator 52 is provided to generate a rise time signal $V_{T(A)}$ indicative of a rise time period for a current in coil 32 to rise between predetermined lower and upper current levels. Signal generator 52 may include the following elements: means, such as comparator 60, for comparing current indicative signal $V_{SENSE(A)}$ to an upper current level signal $V_U$ and generating a comparison signal $V_{C1}$ responsive thereto; means, such as comparator 62, for comparing current indicative signal $V_{SENSE(A)}$ to a lower current level signal $V_L$ and generating a comparison signal $V_{C2}$ responsive thereto; and means, such as logic gate 64, for generating a rise time signal $V_{T(A)}$ responsive to phase control signal $V_{C(A)}$ and comparison signals $V_{C1}$ and $VC_2$.

Comparators 60, 62 are provided to compare current indicative signal $V_{SENSE(A)}$ to upper and lower current level signals $V_U$ and $V_L$, respectively. Comparators 60, 62 are conventional in the art. The positive input of comparator 60 is responsive to upper current level signal $V_U$ generated by controller 46 while the negative input of comparator 60 is responsive to current indicative signal $V_{SENSE(A)}$ generated by amplifier 50. Comparator 60 outputs a comparison signal $V_{C1}$ indicative of whether the level of current in coil 32—represented by current indicative signal $V_{SENSE(A)}$—is less than or greater than a predetermined upper current level—represented by upper current level signal $V_U$. The positive input of comparator 62 is responsive to current indicative signal $V_{SENSE(A)}$ generated by amplifier 50 while the negative input of comparator 62 is responsive to lower current level signal $V_L$ generated by controller 46. Comparator 62 outputs a comparison signal $V_{C2}$ indicative of whether the level of current in coil 32—represented by current indicative signal $V_{SENSE(A)}$—is less than or greater than a predetermined lower current level—represented by lower current level signal $V_L$.

Logic gate 64 is provided to generate a rise time signal $V_{T(A)}$ indicative of the time required for the current in coil 32 to rise between predetermined upper and lower current levels $V_U$ and $V_L$. Gate 64 is conventional in the art and may comprise an AND gate. It should be understood, however, that other gate configurations could be implemented without departing from the spirit of the present invention. Gate 64 is responsive to phase control signal $V_{C(A)}$ and comparison signals $V_{C1}$, and $V_{C2}$.

Logic gate 54 is provided to generate a combined rise time signal $V_{T(ABC)}$ indicative of the time required for the current in each of phase coils 32, 32', 32" of motor 10 to rise between predetermined upper and lower current levels. As such, gate 54 is responsive to rise time signals $V_{T(A)}$, $V_{T(B)}$, and $V_{T(C)}$, respectively, generated by each of the three motor phases 18 in the illustrated embodiment. Gate 54 is conventional in the art and may comprise an OR gate. It should be understood, however, that other gate configurations could be implemented without departing from the spirit of the present invention.

Logic gate 56 is provided for use in connection with a second embodiment of the present invention wherein the current rise time may be measured during either the conduction interval or during a timing interval that occurs a predetermined period of time after the conduction interval. Gate 56 generates the rise time signal $V_T$ responsive to combined rise time signal $V_{T(ABC)}$ and a selection signal $V_S$ generated by controller 46. Selection signal $V_S$ ensures that the measured rise time is provided to controller 46 only during a selected interval (e.g., either during the conduction interval or during the timing interval). Gate 56 is conventional in the art and may comprise an AND gate. Again, however, it should be understood that other gate configurations could be implemented without departing from the spirit of the present invention.

Figure 4A:
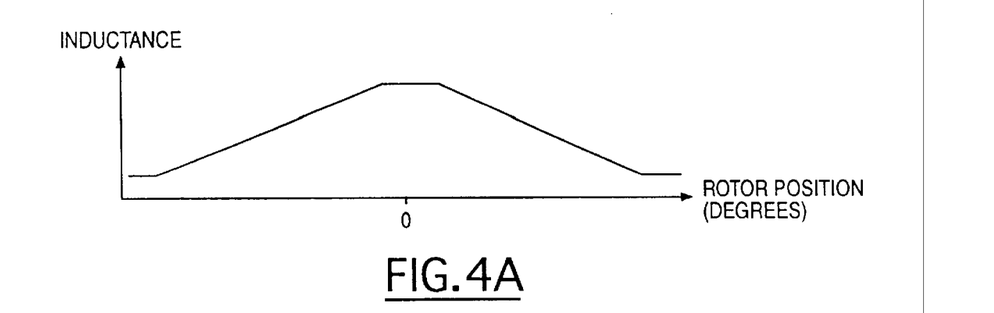
FIGS. 4A–B are timing diagrams illustrating the relationship between current rise time, inductance and rotor position.
Figure 4B:
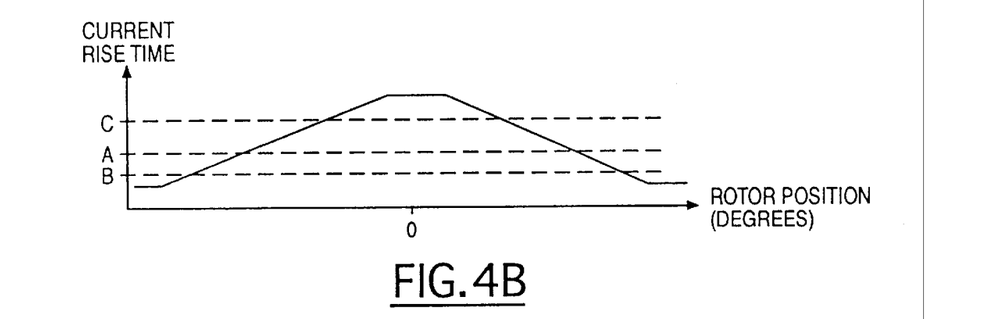

Referring now to FIGS. 4A–B, the principal upon which the inventive circuit and method is based will be described. As is known in the art, phase inductance can be used to estimate rotor position. As shown in FIG. 4A, the level of inductance in any motor phase 18 increases linearly as a pair of rotor poles 24 approach a corresponding pair of stator poles 28. Inductance reaches a maximum when the rotor poles 24 and stator poles 28 are aligned and then decreases linearly as the rotor poles 24 move past the stator poles 28. As shown in FIG. 4B, a similar relationship exists between rotor position and the time required for a current to rise between two predetermined levels in a phase coil of motor 10. As a pair of rotor poles 24 approach a corresponding pair of stator poles 28, the time period required for the current to rise between the two predetermined levels increases linearly. When the rotor poles are aligned with the stator poles, a maximum amount of time is required for the current to rise between the two predetermined current levels. As the rotor poles move past the stator poles, the time required decreases linearly.

As shown in FIGS. 4A–B, the time required for current in a motor phase coil to rise between two predetermined levels is directly proportional to the inductance of the phase coil. As a result, measuring the rise time of current between two predetermined levels provides an estimate of rotor position. The measured rise time can then be compared to a desired rise time that is indicative of a desired "in-phase" relationship between the conduction interval (or current rise time) of the motor phase and rotor position. If the measured rise time differs from the desired rise time, the conduction interval is lagging or leading the rotor. For example, the point designated A in FIG. 4B may represent a desired current rise time for establishing an "in-phase" relationship between the conduction interval of a motor phase 18 and rotor position at a particular operating speed. The points designated B and C may represent measured rise times for current in a phase coil of motor phase 18. As illustrated in FIG. 4B, points A, B, and C may fall on either the positive or negative slope of the current rise time profile. As is known in the art, the conduction intervals for the motor phases 18 of a motor 10 operating a relatively low speed generally begin and end on the positive slope of induction. Therefore, at low speeds, the desired rise time and the measured rise times will fall on the positive slope of the current rise time profile. A current rise time, such as rise time B, that is less than the desired rise time A will indicate that the current is rising between the two predetermined levels more quickly than desired and will therefore indicate that the conduction interval is leading rotor position. A current rise time, such as rise time C, that is greater than the desired rise time A will indicate that the current is rising between the two predetermined levels more slowly than desired and will therefore indicate that the conduction interval is lagging rotor position. As is known in the art, the start of the conduction interval must be advanced as the speed of the motor increases. This is accomplished by initiating the conduction interval earlier—on the negative slope of inductance. As a result, the desired and measured rise times will be found on the negative slope of the current rise time profile as shown in FIG. 4B. Therefore, once the motor reaches a predetermined speed, the current rise time B will be indicative of the conduction interval lagging rotor position while the current rise time C will be indicative of the conduction interval leading rotor position.

Figure 5:
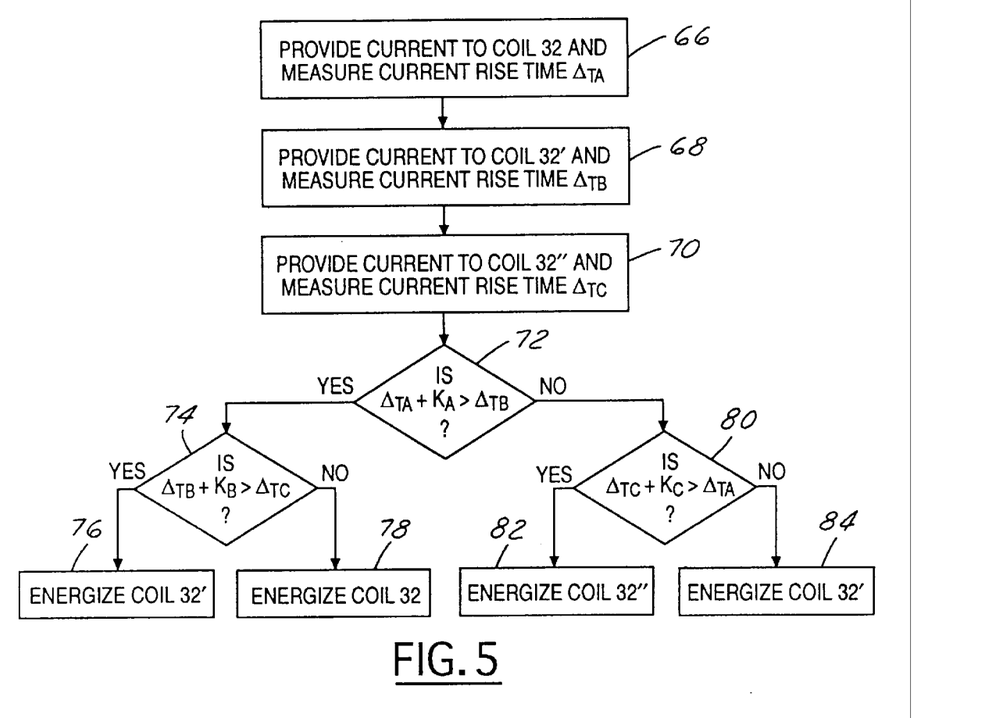
FIG. 5 is a flowchart illustrating a method for starting a motor incorporating a circuit in accordance with the present invention.

A motor incorporating the inventive circuit described above has at least two operating modes: a starting mode and a running mode. Referring to FIG. 5, a method for starting motor 10 will be described in detail. The method may include the steps 66, 68, 70 of providing current to phase coils 32, 32', and 32'' and measuring the time periods $\Delta_{TA}$, $\Delta_{TB}$, and $\Delta_{TC}$, respectively, for the current in each phase coil to rise between two predetermined levels, such as lower and upper current levels $V_L$ and $V_U$. The method may further include the step 72 of comparing the sum of current rise time $\Delta_{TA}$ plus a predetermined offset value $K_A$ to current rise time $\Delta_{TB}$. If the sum of current rise time $\Delta_{TA}$ plus offset value $K_A$ is greater than current rise time $\Delta_{TB}$, the method may include the step 74 of comparing the sum of current rise time $\Delta_{TB}$ plus a predetermined offset value $K_B$ to current rise time $\Delta_{TC}$. If the sum of current rise time $\Delta_{TB}$ plus offset value $K_B$ is greater than current rise time $\Delta_{TC}$, the method may include the step 76 of energizing coil 32'. On the other hand, if the sum of current rise time $\Delta_{TB}$ plus offset value $K_B$ is less than or equal to current rise time $\Delta_{TC}$, the method may include the step 78 of energizing coil 32. Returning to step 72, if the sum of current rise time $\Delta_{TA}$ plus offset value $K_A$ is less than or equal to current rise time $\Delta_{TB}$, the method may include the step 80 of comparing the sum of current rise time $\Delta_{TC}$ plus a predetermined offset value $K_C$ to current rise time $\Delta_{TA}$. If the sum of current rise time $\Delta_{TC}$ plus offset value $K_C$ is greater than current rise time $\Delta_{TA}$, the method may include the step 82 of energizing coil 32''. On the other hand, if the sum of current rise time $\Delta_{TC}$ plus offset value $K_C$ is less than or equal to current rise time $\Delta_{TA}$, the method may include the step 84 of energizing coil 32'. It should be noted that offset values $K_A$, $K_B$, and $K_C$ will depend upon the particular motor 10 being operated.

Referring now to FIGS. 6A–D and 7A–E, a method for controlling motor 10 in accordance with the present invention will be described. This method is used to control motor 10 during the running mode of motor 10 which occurs after one of coils 32, 32', or 32'' has been energized in accordance with the starting algorithm set forth above.

Figure 6A:
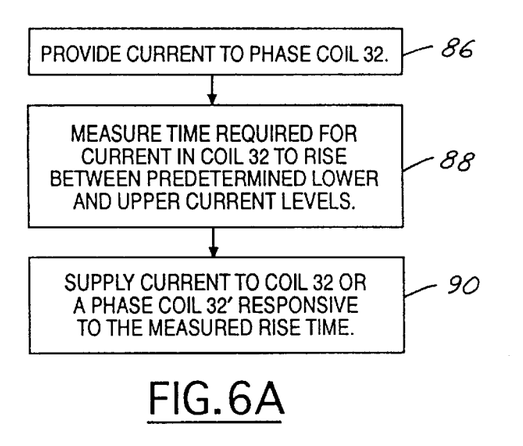
FIGS. 6A–D are flowcharts illustrating a first embodiment of a method for controlling a motor in accordance with the present invention.
Figure 6B:
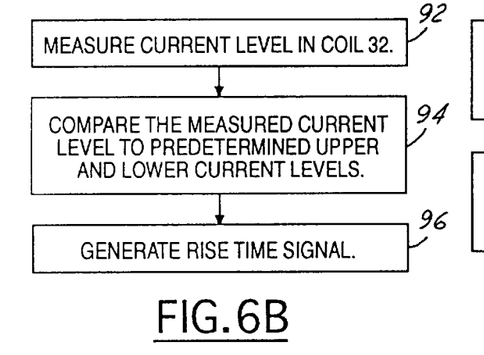
Figure 7A:
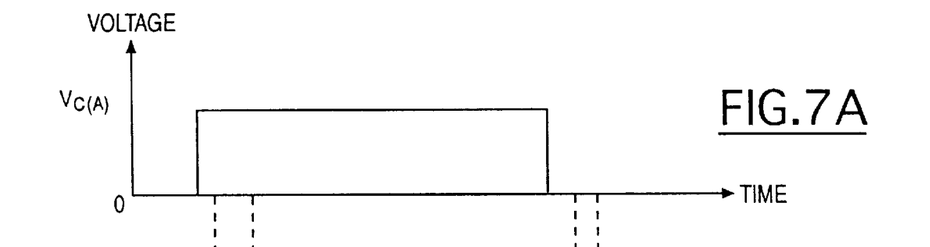
FIGS. 7A–E are timing diagrams illustrating voltage and current levels in the circuit of FIG. 3 over time in accordance with a first embodiment of a method for controlling a motor in accordance with the present invention.
Figure 7B:
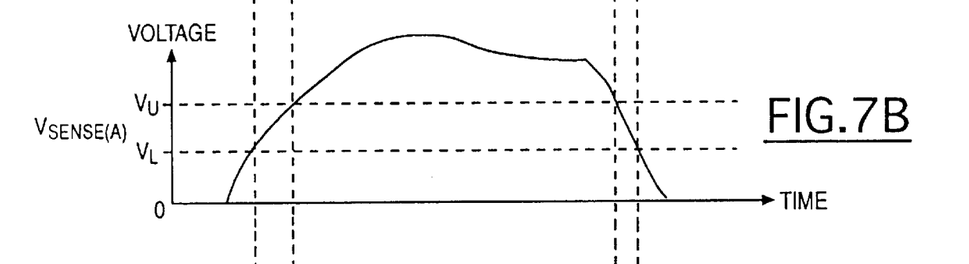
Figure 7C:
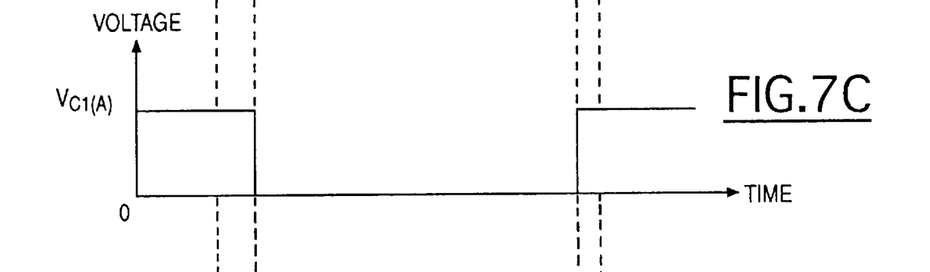
Figure 7D:
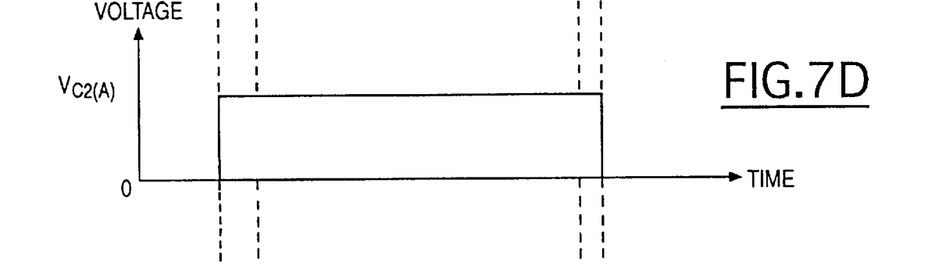
Figure 7E:
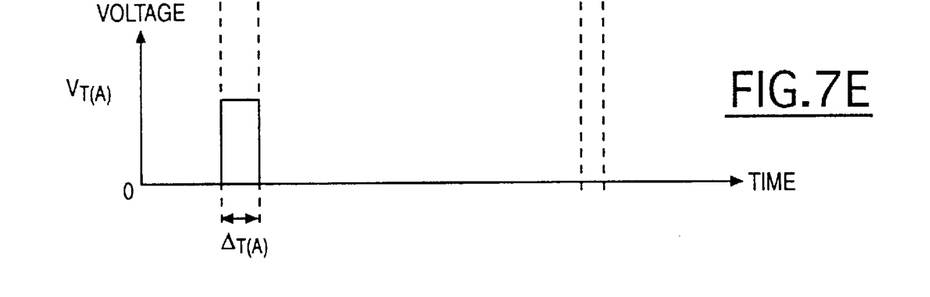

Referring to FIG. 6A, a method for controlling a motor 10 in accordance with the present invention may include the step 86 of providing current to a first phase coil 32 of motor 10. Referring to FIG. 7A, current may be provided to coil 32 when phase control signal $V_{C(A)}$, generated by controller 46, transitions to a high logic level. Referring again to FIG. 6A, a method in accordance with the present invention may further include the step 88 of measuring a rise time period for the current in phase coil 32 to rise between first and second predetermined current levels $V_L$ and $V_U$, respectively. Referring now FIG. 6B, step 88 may include the substep 92 of sensing a level of the current in coil 32. As shown in FIG. 3, within circuit 34 current may be measured using a sensing resistor 48. Amplifier 50 then generates a current indicative signal $V_{SENSE(A)}$, shown in FIG. 7B, responsive to, and indicative of, the current level sensed by resistor 48. Referring again to FIG. 6B, step 88 may further include the substep 94 of comparing the current level in coil 32 to predetermined upper current level $V_U$ and predetermined lower current level $V_L$ and generating comparison signals $V_{C1}$ and $V_{C2}$, respectively. As shown in FIG. 7C, comparison signal $V_{C1}$ assumes a high logic level whenever the current level in coil 32—as indicated by $V_{SENSE(A)}$—is less than upper current level $V_U$. As shown in FIG. 7D, comparison signal $V_{C2}$ assumes a high logic level whenever the current level in coil 32—as indicated by $V_{SENSE(A)}$—is greater than lower current level $V_L$. Referring again to FIG. 6B, step 88 may further include the substep 96 of generating a rise time signal $V_{T(A)}$ indicative of the rise time period $\Delta_{T(A)}$ for the current in coil 32 to rise between predetermined lower and upper current levels $V_L$ and $V_U$. As shown in FIG. 7E, rise time signal $V_{T(A)}$ assumes a high logic level only during the period in which the current level in coil 32 is rising between the lower and upper current levels $V_L$ and $V_U$ and phase control signal $V_{C(A)}$ maintains a high logic level.

Figure 6C:
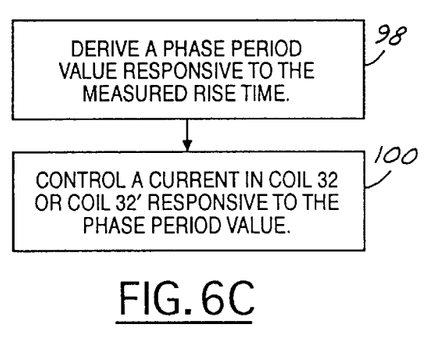

Referring again to FIG. 6A, a method in accordance with the present invention may finally include the step 90 of supplying current to either phase coil 32 or another phase coil—such as phase coil 32' or phase coil 32"—responsive to the rise time period $\Delta_{T(A)}$ indicated by rise time signal $V_{T(A)}$. Referring now to FIG. 6C, step 90 may include the substep 98 of deriving a phase period value P' responsive to the rise time period AT(A). The phase period value P' represents a period of time associated with one or more motor phases 18 of motor 10. Referring to FIG.s 1OA–D, in a constructed embodiment phase period value P' comprises a phase interval period $\Delta_{t1}$ between initiation of a conduction interval 134 in one phase coil, such as phase coil 32, and initiation of a conduction interval 136 in another phase coil, such as coil 32'. Alternatively, phase period value P' could represent the period between initiation of first and second conduction intervals in the same phase coil or the period between initiation and commutation of a conduction interval within a phase coil.

In a constructed embodiment phase period value P' is obtained using the following formula:

$$P'=P+/-K(\Delta_{T(A)}-\Delta_{TD})$$

wherein P represents an existing phase period value associated with the motor phase 18 in which current rise time is being measured, K represents a gain selected to stabilize motor 10 and maintain its operation during transient conditions, and $\Delta_{TD}$ represents a desired rise time value. As described hereinabove with reference to FIG. 4B, desired rise time $\Delta_{TD}$ is indicative of an "in-phase" relationship between rotor position and a conduction interval for the motor phase 18 in which current rise time is being measured.

Figure 6D:
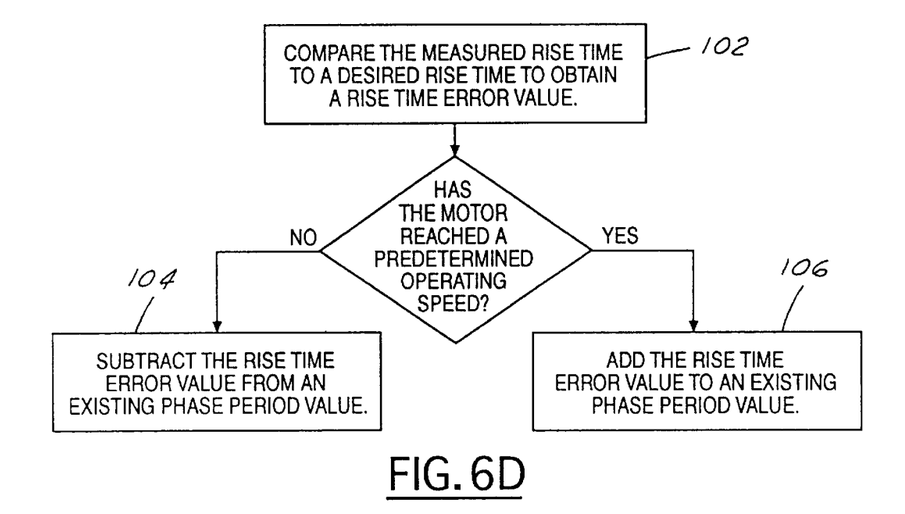

As shown in FIG. 6D, and as reflected in the above-recited formula, substep 98 may include the substep 102 of comparing the measured rise time period $\Delta_{T(A)}$ to desired rise time period $\Delta_{TD}$ to obtain a rise time error value. In a constructed embodiment, this comparison is accomplished by subtracting the desired rise time period $\Delta_{TD}$ from the measured rise time period $\Delta_{T(A)}$. Substep 98 may further include the substep 104 of subtracting the rise time error value from phase period value P to obtain the phase period value P'. As described hereinabove with reference to FIGS. 4A–B, however, the relationship between the desired rise time period $\Delta_{TD}$ and the measured rise time period $\Delta_{T(A)}$ changes once motor 10 reaches a predetermined operating speed and the conduction intervals for each motor phase 18 of motor 10 are initiated on the negative slope of inductance for the motor phase 18. As a result, once motor 10 reaches a predetermined speed, substep 98 may alternatively include the substep 106 of adding the rise time error value to phase period value P in order to obtain phase period value P'.

Referring again to FIGS. 6A and 6C, step 90 may finally include the substep 100 of controlling current in phase coil 32 or another phase coil responsive to phase period value P'. Controller 46 will generate phase control signals, such as $V_{C(A)}$, responsive to phase period value P' in order to initiate and/or commutate conduction intervals within the motor phases and bring the conduction intervals into an "in-phase" relationship with the position of the rotor. For example, if P represents a phase interval period between initiation of conduction intervals in coils 32 and 32', P' represents a phase interval period between initiation of conduction intervals in coils 32' and 32", and the rise time $\Delta_{T(A)}$ of the current in coil 32 indicates that the conduction interval in coil 32 is lagging rotor position, then phase period value P' will be less then phase period value P using the above-recited formula.

As a result, the conduction interval for coil 32" will be initiated earlier than it otherwise would have and will be brought into phase with the position of the rotor.

Figure 8A:
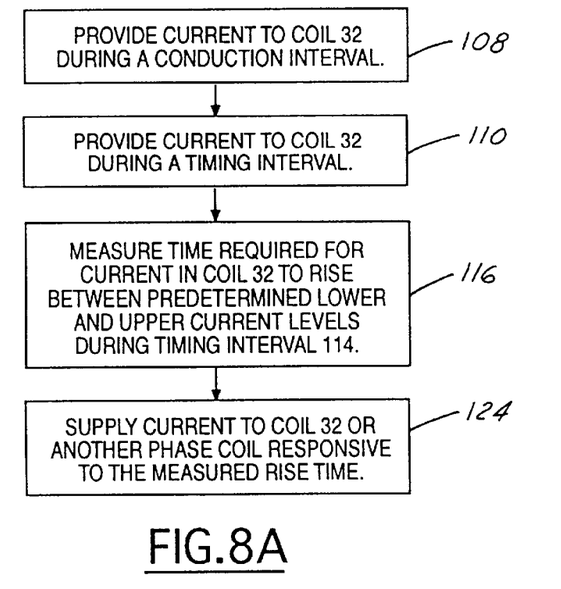
FIGS. 8A–D are flowcharts illustrating a second embodiment of a method for controlling a motor in accordance with the present invention.
Figure 8B:
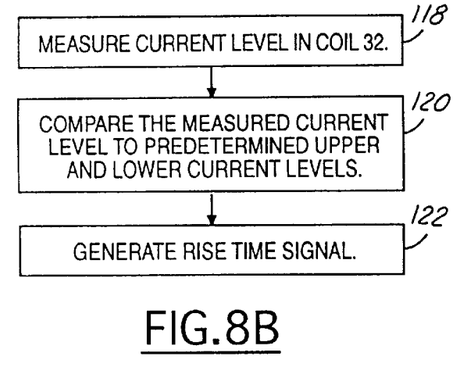
Figure 8C:
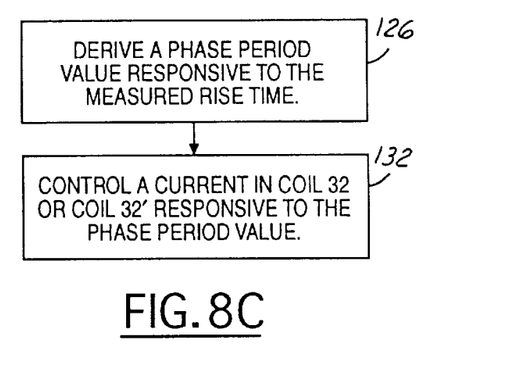
Figure 8D:
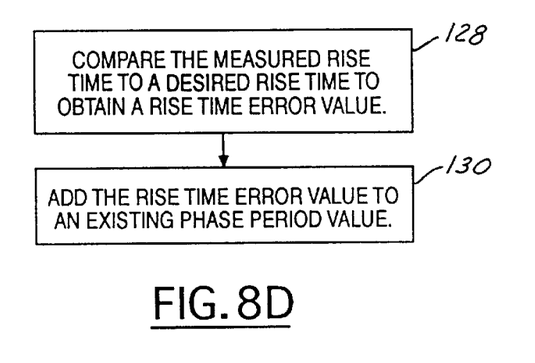
Figure 9A:
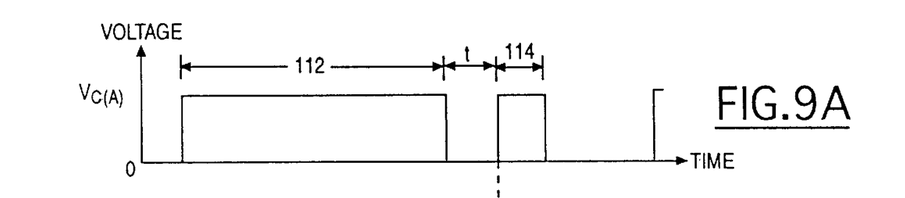
FIGS. 9A–G are timing diagrams illustrating voltage and current levels in the circuit of FIG. 3 over time in accordance with a second embodiment of a method for controlling a motor in accordance with the present invention.
Figure 9B:
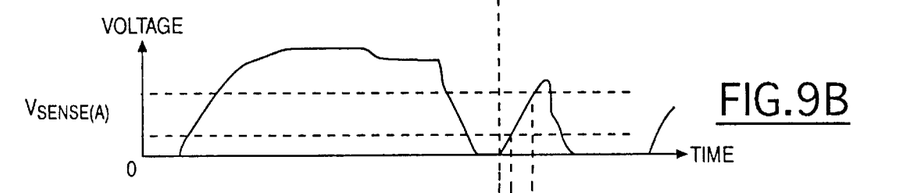

Referring now to FIGS. 8A–D and 9A–G, a second embodiment of a method in accordance with the present invention will be described. Referring to FIGS. 8A and 9A, a method for controlling a motor 10 in accordance with a second embodiment of the present invention may include the steps 108, 110 of providing current to a first phase coil 32 of motor 10 during a conduction interval 112 and providing current to coil 32 during a timing interval 114 beginning a predetermined period of time t after conduction interval 112 ends. As shown in FIG. 9A, current may be provided to coil 32 during conduction interval 112 and timing interval 114 when phase control signal $V_{C(A)}$, generated by controller 46, transitions to a high logic level.

Figure 9C:
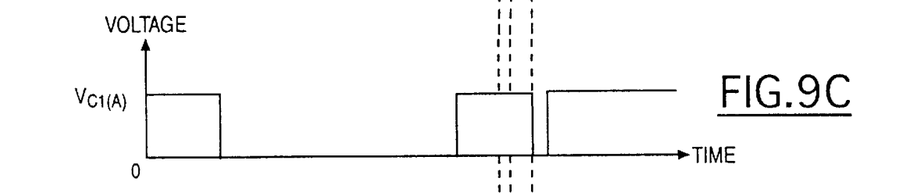
Figure 9D:
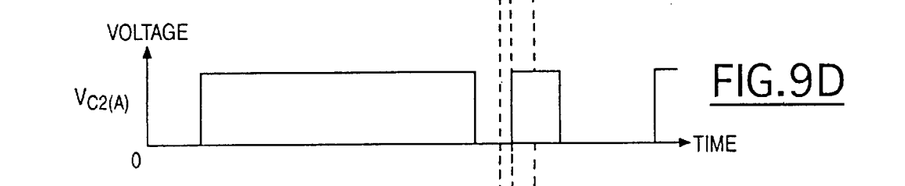
Figure 9E:
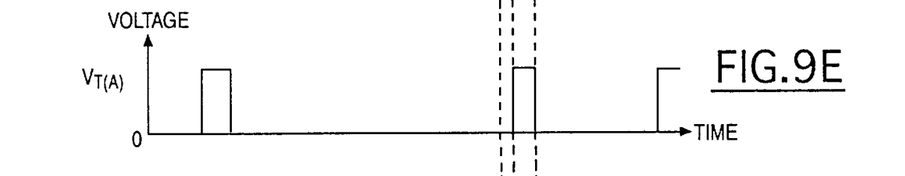
Figure 9F:
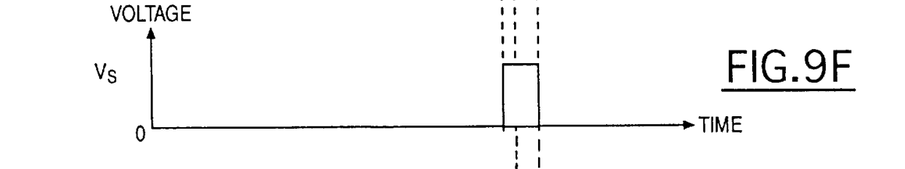
Figure 9G:
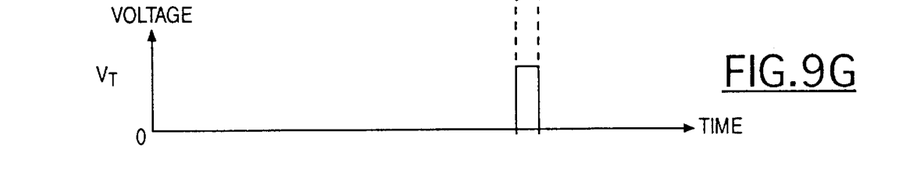
Figure 10A:
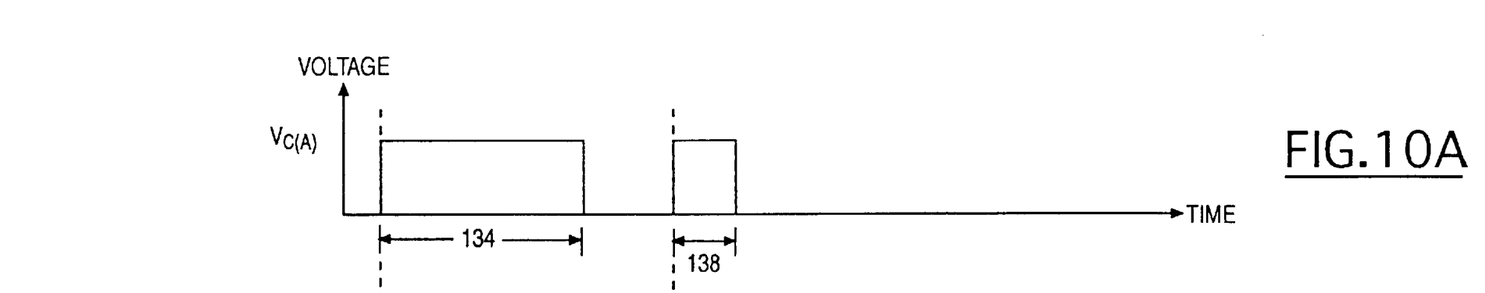
FIGS. 10A–D are timing diagrams illustrating voltage and current levels over time within a circuit in accordance with the present invention.
Figure 10B:
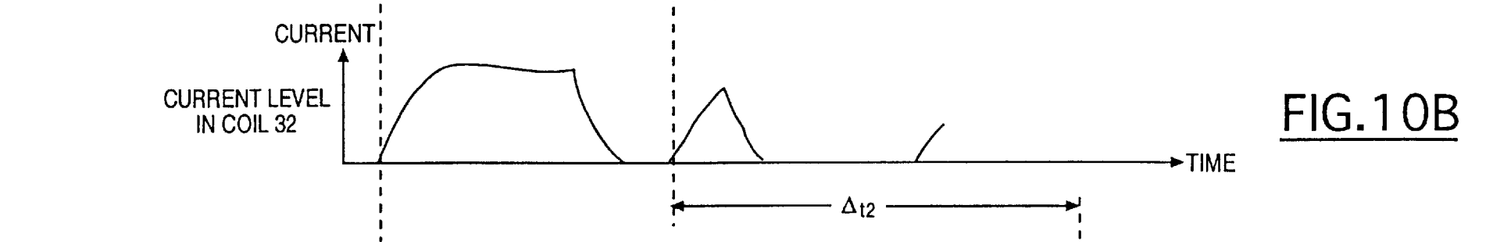
Figure 10C:
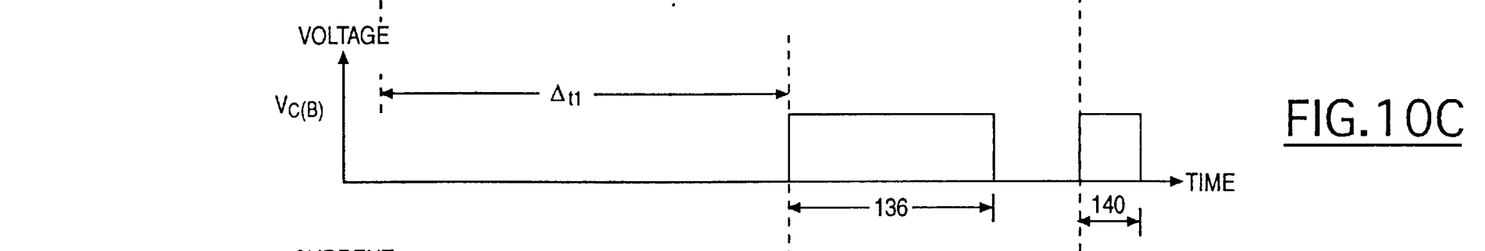
Figure 10D:
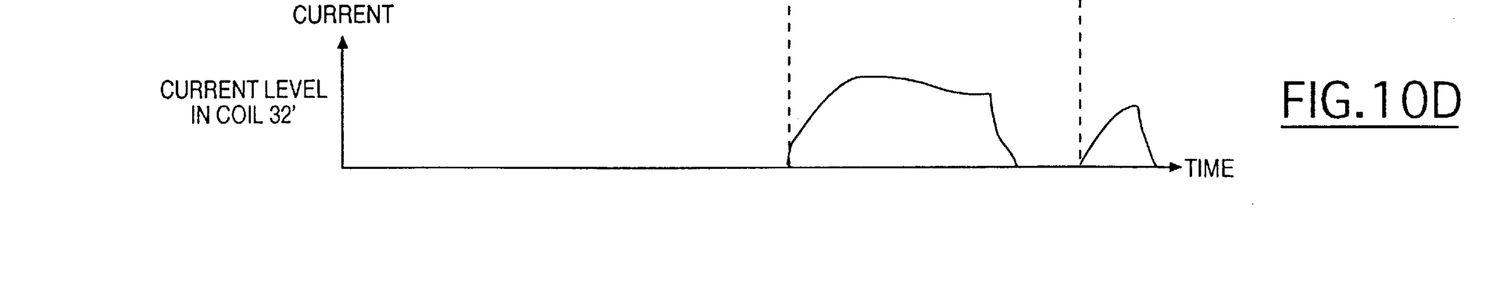

Referring again to FIG. 8A, a method in accordance with the present invention may further include the step 116 of measuring a rise time period for the current in phase coil 32 to rise between first and second predetermined current levels $V_L$ and $V_U$, respectively, during timing interval 114. Referring now FIG. 8B, step 116 may include the substep 118 of sensing a level of the current in coil 32. As shown in FIG. 3, within circuit 34 current may be measured using a sensing resistor 48. Amplifier 50 then generates a current indicative signal $V_{SENSE(A)}$, shown in FIG. 9B, responsive to, and indicative of, the current level sensed by resistor 48. Referring again to FIG. 8B, step 116 may further include the substep 120 of comparing the current level in coil 32 to predetermined upper current level $V_U$ and predetermined lower current level $V_L$ and generating comparison signals $V_{C1}$ and $V_{C2}$, respectively, in response thereto. As shown in FIG. 9C, comparison signal $V_{C1}$ assumes a high logic level whenever the current level in coil 32—as indicated by $V_{SENSE(A)}$—is less than upper current level $V_U$. As shown in FIG. 9D, comparison signal $V_{C2}$ assumes a high logic level whenever the current level in coil 32—as indicated by $V_{SENSE(A)}$—is greater than lower current level $V_L$. Referring again to FIG. 8B, step 116 may further include the substep 122 of generating a rise time signal $V_{T(A)}$ indicative of the rise time period $\Delta_{T(A)}$ for the current in coil 32 to rise between predetermined lower and upper current levels $V_L$ and $V_U$ during timing interval 114. As shown in FIG. 9E, rise time signal $V_{T(A)}$ assumes a high logic level only during the period in which the current level in coil 32 is rising between the lower and upper current levels $V_L$ and $V_U$ and phase control signal $V_{C(A)}$ maintains a high logic level. Because this occurs both during conduction interval 112 and timing interval 114, however, a selection signal $V_S$ generated by controller 46 is used in connection with a logic gate 56 (best shown in FIG. 3) to ensure that only the measured rise time obtained from timing interval 114 is provided to controller 46. As illustrated in FIG. 9F, selection signal $V_S$ assumes a high logic state at the beginning of timing interval 114. Selection signal $V_S$ then transitions to a low logic level responsive to the falling edge of rise time signal $V_{T(A)}$. It should be noted that, if multiple timing intervals 114 are used between conduction intervals 112, selection signal $V_S$ may be used to select which timing interval 114 to use for rise time measurements.

Referring again to FIG. 8A, a method in accordance with the present invention may finally include the step 124 of supplying current to either phase coil 32 or another phase coil—such as phase coil 32' or phase coil 32"—responsive to the rise time period $\Delta_{T(A)}$ indicated by rise time signal $V_{T(A)}$. Referring now to FIG. 8C, step 124 may include the substep 126 of deriving a phase period value P' responsive to the rise time period $\Delta_{T(A)}$. The phase period value P' represents a period of time associated with one or more motor phases 18 of motor 10. Referring to FIGS. 10A–D, in one constructed embodiment phase period value P' comprises a phase interval period $\Delta_{t1}$ between initiation of a conduction interval 134 in one phase coil, such as phase coil 32, and the initiation of a conduction interval 136 in another phase coil, such as coil 32'. In a second constructed embodiment, phase period value P' comprises a phase interval period $\Delta_{t2}$ between initiation of a timing interval 138 in one phase coil, such as coil 32, and the initiation of a timing interval 140 in another phase coil. Alternatively, phase period value P' could represent the period between initiation of first and second conduction intervals or timing intervals in the same phase coil or the period between initiation and commutation of a conduction interval or timing interval within a phase coil.

In a constructed embodiment phase period value P' is obtained using the following formula:

$$P'=P+K(\Delta_{T(A)}-\Delta_{TD})$$

wherein P represents an existing phase period value associated with the motor phase 18 in which current rise time is being measured, K represents a gain selected to stabilize motor 10 and maintain its operation during transient conditions, and $\Delta_{TD}$ represents a desired rise time value. As described hereinabove with reference to FIG. 4B, desired rise time $\Delta_{TD}$ is indicative of "in-phase" relationship between rotor position and a conduction interval for the motor phase 18 in which current rise time is being measured.

As shown in FIG. 8D, and as reflected in the above-recited formula, substep 126 may include the substep 128 of comparing the measured rise time period $\Delta_{T(A)}$ to desired rise time period $\Delta_{TD}$ to obtain a rise time error value. In a constructed embodiment, this comparison is accomplished by subtracting the desired rise time period $\Delta_{TD}$ from the measured rise time period $\Delta_{TA}$). Substep 126 may further include the substep 130 of adding the rise time error value to phase period value P to obtain the phase period value P'. Unlike the first method embodiment described hereinabove, the rise time error value will always be added to the phase period value P. This is because conduction interval 112 is normally commutated at or near the end of the positive slope of inductance. By beginning timing interval 114 a predetermined period of time t after the end of conduction interval 112, timing interval 114 can be made to occur during the negative slope of inductance in coil 32. Because the desired rise time and the measured rise times will then always occur on the negative slope of the rise time current profile, the rise time error value will always be added to phase period value P.

Referring again to FIGS. 8A and 8C, step 124 may finally include the substep 132 of controlling current in phase coil 32 or another phase coil responsive to phase period value P'. Controller 46 will generate phase control signals, such as $V_{C(A)}$, responsive to phase period value P' in order to initiate and/or commutate conduction intervals within the motor phases and bring the conduction intervals into an "in-phase" relationship with the position of the rotor. For example, if P represents a phase interval period between initiation of conduction intervals in coils 32 and 32', P' represents a phase interval period between initiation of conduction intervals in coils 32' and 32", and the rise time $\Delta_{T(A)}$ of the current in coil 32 indicates that the conduction interval in coil 32 is lagging rotor position, then phase period value P' will be less then phase period value P using the above-recited formula. As a result, the conduction interval for coil 32" will be initiated earlier than it otherwise would have and will be brought into phase with the position of the rotor.

While the invention has been particularly shown and described with reference to the preferred embodiments thereof, it is well understood by those skilled in the art that various changes and modifications can be made in the invention without departing from the spirit and scope of the invention.

We claim:

1. A method for controlling a motor, comprising the steps of:

providing current to a first phase coil of said motor;

measuring a rise time period for said current in said first phase coil to rise between first and second predetermined current levels;

comparing said rise time period to a desired rise time period to obtain a rise time error value, said rise time error value indicative of an amount by which a first conduction interval in said first phase coil is leading or lagging a position of a rotor in said motor;

deriving a first phase period value responsive to said rise time error value; and, controlling current in one of said first phase coil and a second phase coil of said motor responsive to said first phase period value.

2. The method of claim 1 wherein said measuring step includes the substeps of:

sensing a level of said current in said first phase coil;

comparing said level of said current to said first predetermined current level;

comparing said level of said current to said second predetermined current level; and, generating a rise time signal indicative of said rise time period.

3. The method of claim 1 wherein said deriving step includes the substep of subtracting said rise time error value from a second phase period value to obtain said first phase period value.

4. The method of claim 1 wherein said deriving step includes the substep of adding said rise time error value to a second phase period value to obtain said first phase period value.

5. The method of claim 1 wherein said first phase period value comprises a period between initiation of a second conduction interval in said one phase coil and initiation of a third conduction interval in another phase coil.

6. The method of claim 1 wherein said first phase period value comprises a period between initiation of a second timing interval in said one phase coil and initiation of a third timing interval in another phase coil.

7. The method of claim 1 wherein said controlling step includes the substep of commutating a second conduction interval of said one phase coil responsive to said first phase period value.

8. A method for controlling a motor, comprising the steps of:

providing current to a first phase coil of said motor during a first conduction interval;

providing current to said first phase coil during a timing interval after said first conduction interval has ended;

measuring a rise time period for said current in said first phase coil to rise between first and second predetermined current levels during said timing interval; and, supplying current to one of said first phase coil and a second phase coil of said motor responsive to said rise time period.

9. The method of claim 8 wherein said timing interval begins a predetermined period of time after said first conduction interval ends.

10. The method of claim 8 wherein said measuring step includes the substeps of:

sensing a level of said current in said first phase coil;

comparing said level of said current to said first predetermined current level;

comparing said level of said current to said second predetermined current level; and, generating a rise time signal indicative of said rise time period.

11. The method of claim 8 wherein said supplying step includes the substeps of:

deriving a first phase period value responsive to said rise time period; and, controlling current in said one phase coil responsive to said first phase period value.

12. The method of claim 11 wherein said deriving step includes the substeps of:

comparing said rise time period to a desired rise time period to obtain a rise time error value; and, adding said rise time error value to a second phase period value to obtain said first phase period value.

13. The method of claim 11 wherein said first phase period value comprises a period between initiation of a first conduction interval in said one phase coil and initiation of a second conduction interval in another phase coil.

14. The method of claim 11 wherein said first phase period value comprises a period between initiation of a first timing interval in said one phase coil and initiation of a second timing interval in another phase coil.

15. The method of claim 11 wherein said controlling step includes the substep of commutating a conduction interval of said one phase coil responsive to said first phase period value.

16. A control circuit for a motor, comprising:

means for providing current to a first phase coil of said motor;

a rise time signal generator that generates a rise time signal indicative of a rise time period for said current in said first phase coil to rise between first and second predetermined current levels;

means for comparing said rise time period to a desired rise time period to obtain a rise time error value, said rise time error value indicative of an amount by which a first conduction interval in said first phase coil is leading or lagging a position of a rotor in said motor;

means for deriving a first phase period value responsive to said rise time error value; and, means for controlling current in one of said first phase coil and a second phase coil of said motor responsive to said first phase period value.

17. The control circuit of claim 16 further comprising a current sensor that senses a level of current in said first phase coil wherein said rise time signal generator is responsive to said current sensor.

18. The control circuit of claim 16 wherein said rise time signal generator includes a first comparator that compares a level of said current in said first phase coil to said first predetermined current level;

a second comparator that compares said level of said current in said first phase coil to said second predetermined current level; and, a logic gate that generates said rise time signal responsive to said first and second comparators.

19. The circuit of claim 16 wherein said controlling means includes a first switch disposed on one side of said one phase coil;

a second switch disposed on another side of said one phase coil; and, a microcontroller that controls said first and second switches responsive to said first phase period value.

* * * * *